(12) United States Patent
Matsuoka et al.

(10) Patent No.: US 10,454,417 B2
(45) Date of Patent: Oct. 22, 2019

(54) SOLAR POWER GENERATION SYSTEM

(71) Applicant: TOSHIBA MITSUBISHI-ELECTRIC INDUSTRIAL SYSTEMS CORPORATION, Chuo-ku (JP)

(72) Inventors: Yuji Matsuoka, Chuo (JP); Eiichi Ikawa, Chuo (JP)

(73) Assignee: TOSHTBA MITSUBISHI-ELECTRTIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 16/091,594

(22) PCT Filed: Apr. 8, 2016

(86) PCT No.: PCT/JP2016/061583
§ 371 (c)(1),
(2) Date: Oct. 5, 2018

(87) PCT Pub. No.: WO2017/175393
PCT Pub. Date: Oct. 12, 2017

(65) Prior Publication Data
US 2019/0089300 A1 Mar. 21, 2019

(51) Int. Cl.
*H02M 7/48* (2007.01)
*H02S 50/00* (2014.01)
(Continued)

(52) U.S. Cl.
CPC .............. *H02S 50/00* (2013.01); *H02J 3/385* (2013.01); *H02M 7/48* (2013.01); *H02M 7/537* (2013.01);
(Continued)

(58) Field of Classification Search
CPC .......... H02S 50/00; H02S 50/10; H02S 40/32; H02J 3/385
(Continued)

(56) References Cited

U.S. PATENT DOCUMENTS

| 6,111,767 A * | 8/2000 | Handleman ............... G05F 1/67 136/293 |
| 2011/0175454 A1* | 7/2011 | Williams .................. G05F 1/67 307/82 |

(Continued)

FOREIGN PATENT DOCUMENTS

| CN | 103605891 A | 2/2014 |
| JP | 2013-152687 A | 8/2013 |

(Continued)

OTHER PUBLICATIONS

International Search Report dated Jun. 21, 2016 in PCT/JP2016/061583 filed Apr. 8, 2016.
(Continued)

*Primary Examiner* — Alex Torres-Rivera
(74) *Attorney, Agent, or Firm* — Oblon, McClelland, Maier & Neustadt, L.L.P.

(57) ABSTRACT

A solar power generation system includes an inverter configured to convert DC power inputted from a solar battery to AC power, a MPPT control section configured to perform maximum power point tracking control on the inverter, an input power measurement section configured to measure the DC power inputted to the inverter at a time of avoiding a transient state due to variation in DC voltage of the inverter by the maximum power point tracking control, an output power measurement section configured to measure the AC power outputted from the inverter at the time of avoiding the transient state, and a conversion efficiency computation section configured to compute conversion efficiency of the inverter based on the DC power measured by the input
(Continued)

power measurement section and the AC power measured by the output power measurement section.

9 Claims, 4 Drawing Sheets

(51) Int. Cl.
*H02S 40/32* (2014.01)
*H02J 3/38* (2006.01)
*H02M 7/537* (2006.01)
*H02M 7/5387* (2007.01)

(52) U.S. Cl.
CPC ......... *H02M 7/53871* (2013.01); *H02S 40/32* (2014.12)

(58) Field of Classification Search
USPC ........ 323/906; 363/95, 96, 97, 98, 131, 132, 363/133, 134, 135, 136, 137
See application file for complete search history.

(56) References Cited

U.S. PATENT DOCUMENTS

| | | | |
|---|---|---|---|
| 2012/0256612 A1* | 10/2012 | Alonso | ............... H02J 7/35 |
| | | | 323/311 |
| 2016/0141978 A1 | 5/2016 | Matsuoka et al. | |

FOREIGN PATENT DOCUMENTS

| | | |
|---|---|---|
| JP | 2014-143856 A | 8/2014 |
| JP | 2015-79833 A | 4/2015 |
| JP | 2015-89145 A | 5/2015 |
| WO | WO 2015/011781 A1 | 1/2015 |

OTHER PUBLICATIONS

Office Action dated Jul. 25, 2019 in counterpart Chinese Patent Application No. 201680084232.7, along with an English machine translation.

* cited by examiner

SOLAR POWER GENERATION SYSTEM

TECHNICAL FIELD

Embodiments of the invention relate to a solar power generation system.

BACKGROUND ART

In general, DC power generated by a solar battery is converted to AC power by an inverter and supplied to a power system. The inverter converts the inputted DC power to AC power synchronized with the system voltage of the power system.

It is known to perform maximum power point tracking (MPPT) control on the inverter so as to maximize the power outputted from the solar battery. For instance, a solar power generation system is disclosed in which the MPPT control is performed at normal time to prevent distortion in the output current due to deficiency in the output voltage of the inverter (e.g., see Patent Literature 1).

The measurement accuracy in the quantity of electricity is important in confirming the operating condition of the inverter. However, the measurement methods known in the art are insufficient in accuracy.

PRIOR ART DOCUMENT

Patent Literature

[Patent Literature 1]
WO2015/011781

SUMMARY OF INVENTION

An object of the invention is to provide a solar power generation system in which the measurement accuracy in the quantity of electricity is improved.

A solar power generation system according to the invention comprises: an inverter configured to convert DC power inputted from a solar battery to AC power; a maximum power point tracking control section configured to perform maximum power point tracking control on the inverter; an input power measurement section configured to measure the DC power inputted to the inverter at a time of avoiding a transient state due to variation in DC voltage of the inverter by the maximum power point tracking control; an output power measurement section configured to measure the AC power outputted from the inverter at the time of avoiding the transient state; and a conversion efficiency computation section configured to compute conversion efficiency of the inverter based on the DC power measured by the input power measurement section and the AC power measured by the output power measurement section.

DESCRIPTION OF EMBODIMENTS

Embodiments of the invention will now be described with reference to the drawings.

First Embodiment

Figure 1:
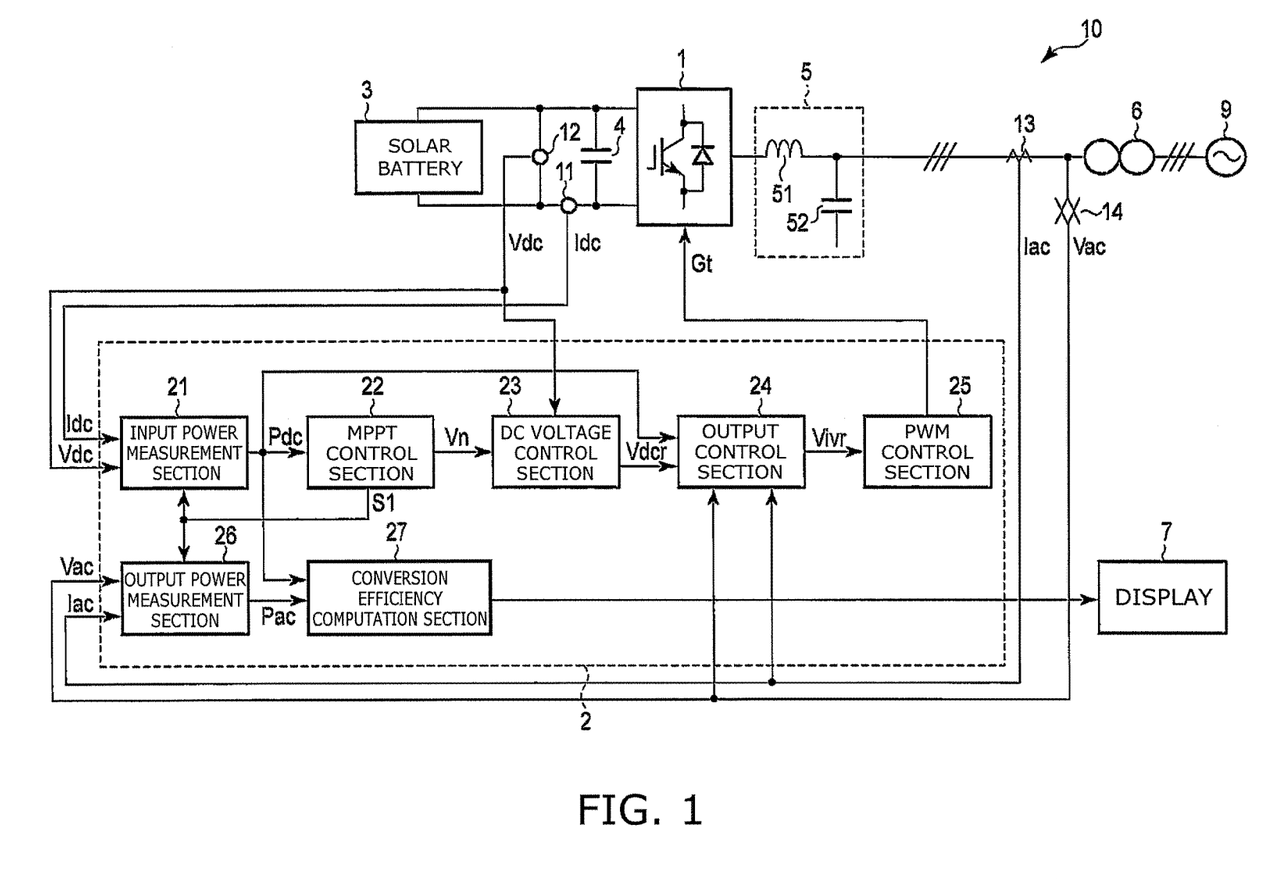
FIG. 1 is a configuration view showing the configuration of a solar power generation system based on a control device according to a first embodiment of the invention.

FIG. 1 is a configuration view showing the configuration of a solar power generation system 10 based on a control device 2 according to a first embodiment of the invention. The same portions in the drawings are marked with the same numerals, and the detailed description thereof is omitted. The different portions are described primarily.

The solar power generation system 10 is provided with an inverter 1, a control device 2, a solar battery 3, a smoothing capacitor 4, an AC filter 5, an interconnection transformer 6, a display 7, a DC current detector 11, a DC voltage detector 12, an AC current detector 13, and an AC voltage detector 14. The solar power generation system 10 is interconnected with a power system 9.

The solar battery 3 is a battery for generating power from solar light. The solar battery 3 supplies the generated power to the inverter 1. The solar battery 3 is configured so that a plurality of unit cells are connected in series and in parallel. For instance, the solar battery 3 is a PV array (photovoltaic array). The solar battery 3 may be configured arbitrarily as long as including at least one unit cell.

The inverter 1 converts the DC power supplied from the solar battery 3 into three-phase AC power synchronized with the power system 9. The inverter 1 supplies the converted AC power to the power system 9. The inverter 1 is subjected to pulse width modulation (PWM) control by the control device 2. The inverter 1 performs power conversion operation in response to a gate signal Gt outputted from the control device 2. For instance, the inverter 1 is a power conditioning system (PCS).

The smoothing capacitor 4 is provided on the DC side (input side) of the inverter 1. The smoothing capacitor 4 smoothes the DC voltage supplied from the solar battery 3 to the inverter 1.

The AC filter 5 is provided on the AC side (output side) of the inverter 1. The AC filter 5 is provided with a reactor 51 and a capacitor 52. The AC filter 5 suppresses harmonics outputted from the inverter 1. The AC filter 5 may be provided anywhere between the inverter circuit incorporated in the inverter 1 and the power system 9. For instance, the AC filter 5 may be incorporated in the inverter 1.

The interconnection transformer 6 is a transformer provided on the power system 9 side of the AC filter 5. The interconnection transformer 6 may be provided anywhere between the inverter circuit incorporated in the inverter 1 and the power system 9. For instance, when the interconnection transformer 6 is incorporated in the inverter 1, the interconnection transformer 6 may be provided on the inverter circuit side of the AC filter 5. The interconnection transformer 6 may not constitute the solar power generation system 10. Furthermore, the interconnection transformer 6 may be replaced by an interconnection reactor.

The display 7 displays various information on the inverter 1. The various information includes the conversion efficiency of the inverter 1. The conversion efficiency is represented by the ratio of output power (AC power) Pac to input power (DC power) Pdc. The display 7 may double as an input function for inputting e.g. various settings of the solar power generation system 10.

The DC current detector 11 is a detector for measuring the current Idc on the DC side of the inverter 1. The DC current detector 11 outputs the detected DC current (input current) Idc to the control device 2.

The DC voltage detector 12 is a detector for measuring the voltage Vdc on the DC side of the inverter 1 (the voltage of the smoothing capacitor 4). The DC voltage detector 12 outputs the detected DC voltage (input voltage) Vdc to the control device 2.

The AC current detector 13 is a detector for measuring the current Iac on the AC side of the inverter 1. The AC current detector 13 outputs the detected AC current (output current) Iac to the control device 2. The AC current detector 13 may be provided anywhere between the inverter circuit incorporated in the inverter 1 and the power system 9.

The AC voltage detector 14 is a detector for measuring the voltage (output voltage) Vac on the AC side of the inverter 1. The AC voltage detector 14 outputs the detected AC voltage Vac to the control device 2. The AC voltage detector 14 may be provided anywhere between the inverter circuit incorporated in the inverter 1 and the power system 9.

The control device 2 controls the inverter 1 based on the detection values received from the detectors 11-14. The control device 2 is provided with an input power measurement section 21, an MPPT control section 22, a DC voltage control section 23, an output control section 24, a PWM control section 25, an output power measurement section 26, and a conversion efficiency computation section 27.

The input power measurement section 21 measures the input power Pdc based on the DC current Idc detected by the DC current detector 11 and the DC voltage Vdc detected by the DC voltage detector 12. The input power measurement section 21 outputs the measured input power Pdc to the MPPT control section 22, the output control section 24, and the conversion efficiency computation section 27. The input power measurement section 21 receives a measurement lock signal S1 from the MPPT control section 22. The input power measurement section 21 does not measure the input power Pdc while receiving the measurement lock signal S1. In this case, the input power measurement section 21 may not output the input power Pdc, or may output the input power Pdc measured most recently.

The MPPT control section 22 performs MPPT control on the inverter 1 based on the input power Pdc measured by the input power measurement section 21. The MPPT control section 22 outputs a voltage adjustment signal Vn determined by the MPPT control. The voltage adjustment signal Vn is a signal indicating an instruction for raising or lowering the present DC voltage Vdc by the amount of one predetermined step. Each time the MPPT control section 22 outputs the voltage adjustment signal Vn, the MPPT control section 22 outputs the measurement lock signal S1 to the input power measurement section 21 and the output power measurement section 26. The voltage adjustment signal Vn and the measurement lock signal S1 may be outputted simultaneously or not simultaneously. The measurement lock signal S1 is a signal for avoiding the measurement of the quantity of electricity in the transient state due to the MPPT control. Here, the transient state due to the MPPT control refers to the state in which the input power Pdc or the output power Pac is not stable immediately after the DC voltage Vdc is varied (raised or lowered) by the MPPT control.

Next, the operation by the MPPT control of the MPPT control section 22 is described.

First, the MPPT control section 22 measures the present input power Pdc (obtained from the input power measurement section 21).

The MPPT control section 22 compares the newly measured input power Pdc with the input power Pdc stored at the time of the previous measurement. After the comparison, the MPPT control section 22 stores the present input power Pdc for the next comparison.

As the result of comparison, when the present input power Pdc is larger, the MPPT control section 22 outputs a voltage adjustment signal Vn of the same sign as the previous time. Specifically, when the previous voltage adjustment signal Vn is a signal for raising the voltage, the MPPT control section 22 outputs the voltage adjustment signal Vn as a signal for raising the voltage also this time. When the previous voltage adjustment signal Vn is a signal for lowering the voltage, the MPPT control section 22 outputs the voltage adjustment signal Vn as a signal for lowering the voltage also this time. On the other hand, when the present input power Pdc is smaller, the MPPT control section 22 outputs a voltage adjustment signal Vn of the opposite sign from the previous time.

After the DC voltage Vdc is raised or lowered by the voltage adjustment signal Vn, the MPPT control section 22 newly measures the input power Pdc. After measuring the new input power Pdc, the MPPT control section 22 returns to the aforementioned initial procedure. Then, the MPPT control section 22 compares the newly measured input power Pdc with the input power Pdc measured at the previous time. Thus, the MPPT control section 22 repeats the aforementioned procedure. Accordingly, the MPPT control section 22 controls the DC voltage Vdc so that the output power from the solar battery 3 is always near the maximum power.

The DC voltage control section 23 is inputted with the DC voltage Vdc detected by the DC voltage detector 12 and the voltage adjustment signal Vn determined by the MPPT control section 22. The DC voltage control section 23 computes a DC voltage instruction value Vdcr for controlling the DC voltage Vdc based on the DC voltage Vdc and the voltage adjustment signal Vn. When the voltage adjustment signal Vn is a signal for raising the voltage, the DC voltage instruction value Vdcr is computed as an instruction value for setting the voltage to a voltage raised from the present DC voltage Vdc by the amount of one step. When the voltage adjustment signal Vn is a signal for lowering the voltage, the DC voltage instruction value Vdcr is computed as an instruction value for setting the voltage to a voltage lowered from the present DC voltage Vdc by the amount of one step. The DC voltage control section 23 outputs the computed DC voltage instruction value Vdcr to the output control section 24.

The output control section 24 is inputted with the AC current Iac detected by the AC current detector 13, the AC voltage Vac detected by the AC voltage detector 14, the input power Pdc measured by the input power measurement section 21, and the DC voltage instruction value Vdcr computed by the DC voltage control section 23. The output control section 24 computes an output voltage instruction value Vivr for controlling the output voltage of the inverter 1 based on the AC current Iac, the AC voltage Vac, the input power Pdc, and the DC voltage instruction value Vdcr. The output control section 24 computes the output voltage instruction value Vivr so as to perform the following control.

The output control section 24 performs control so that the output voltage of the inverter 1 is synchronized with the system voltage of the power system 9. The output control section 24 performs control so that the DC voltage Vdc of the inverter 1 follows the DC voltage instruction value Vdcr. The output control section 24 performs control so that the AC current Iac follows a current instruction value. The current instruction value may be preset in the control device 2, or may be received from a higher-level control system. The output control section 24 may control the active power and the reactive power outputted from the inverter 1 by two current instruction values of an active current instruction value and a reactive current instruction value.

The PWM control section 25 receives the output voltage instruction value Vivr computed by the output control section 24. The PWM control section 25 generates a gate signal Gt for driving a plurality of switching elements constituting the inverter circuit of the inverter 1 so that the output voltage of the inverter 1 is set to the output voltage instruction value Vivr. The PWM control section 25 performs PWM control on the inverter 1 by the generated gate signal Gt.

The output power measurement section 26 measures the output power Pac based on the AC current Iac detected by the AC current detector 13 and the AC voltage Vac detected by the AC voltage detector 14. The output power measurement section 26 outputs the measured output power Pac to the conversion efficiency computation section 27. Like the input power measurement section 21, the output power measurement section 26 receives the measurement lock signal S1 from the MPPT control section 22. The output power measurement section 26 does not measure the output power Pac while receiving the measurement lock signal S1. In this case, the output power measurement section 26 may not output the output power Pac, or may output the output power Pac measured most recently.

The conversion efficiency computation section 27 computes the conversion efficiency of the inverter 1 based on the input power Pdc measured by the input power measurement section 21 and the output power Pac measured by the output power measurement section 26. The conversion efficiency is determined by dividing the output power Pac by the input power Pdc. The conversion efficiency computation section 27 outputs the computed conversion efficiency to the display 7. The display 7 displays the conversion efficiency received from the conversion efficiency computation section 27.

Figure 2:
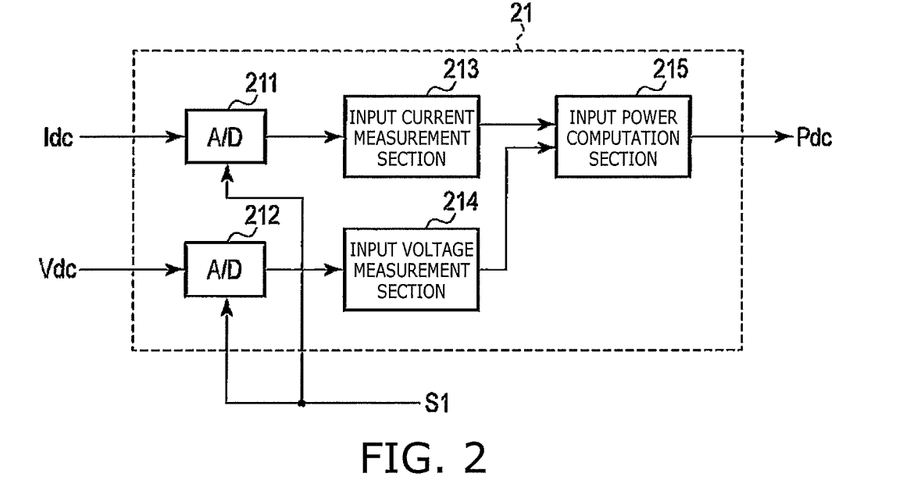
FIG. 2 is a configuration view showing the configuration of the input power measurement section according to the first embodiment.

FIG. 2 is a configuration view showing the configuration of the input power measurement section 21 according to this embodiment.

The input power measurement section 21 is provided with two A/D converters 211, 212, an input current measurement section 213, an input voltage measurement section 214, and an input power computation section 215.

The A/D converter 211 receives an analog signal indicating the DC current Idc detected by the DC current detector 11 and the measurement lock signal S1 outputted from the MPPT control section 22. While not receiving the measurement lock signal S1, the A/D converter 211 converts the received analog signal indicating the DC current Idc to a digital signal, and outputs the converted digital signal indicating the DC current Idc to the input current measurement section 213. On the other hand, while receiving the measurement lock signal S1, the A/D converter 211 does not perform signal conversion. This can avoid the DC current Idc being measured in an unstable state due to the transient state. In this case, the A/D converter 211 may not output the digital signal indicating the DC current Idc, or may output the digital signal indicating the DC current Idc converted most recently.

The A/D converter 212 receives an analog signal indicating the DC voltage Vdc detected by the DC voltage detector 12 and the measurement lock signal S1 outputted from the MPPT control section 22. While not receiving the measurement lock signal S1, the A/D converter 212 converts the received analog signal indicating the DC voltage Vdc to a digital signal, and outputs the converted digital signal indicating the DC voltage Vdc to the input voltage measurement section 214. On the other hand, while receiving the measurement lock signal S1, the A/D converter 212 does not perform signal conversion. This can avoid the DC voltage Vdc being measured in an unstable state due to the transient state. The rest of the configuration is similar to that of the A/D converter 211.

The input current measurement section 213 measures the DC current Idc based on the digital signal indicating the DC current Idc inputted from the A/D converter 211. The input current measurement section 213 outputs the measured DC current Idc to the input power computation section 215.

The input voltage measurement section 214 measures the DC voltage Vdc based on the digital signal indicating the DC voltage Vdc inputted from the A/D converter 212. The input voltage measurement section 214 outputs the measured DC voltage Vdc to the input power computation section 215.

The input power computation section 215 computes the input power Pdc based on the DC current Idc measured by the input current measurement section 213 and the DC voltage Vdc measured by the input voltage measurement section 214. The input power Pdc computed by the input power computation section 215 represents the input power Pdc measured by the input power measurement section 21.

Figure 3:
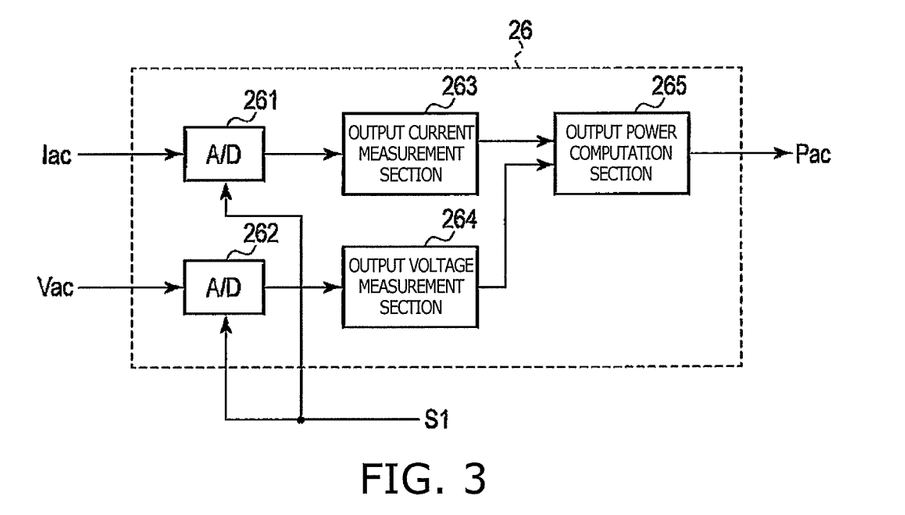
FIG. 3 is a configuration view showing the configuration of the output power measurement section according to the first embodiment.

FIG. 3 is a configuration view showing the configuration of the output power measurement section 26 according to this embodiment.

The output power measurement section 26 is provided with two A/D converters 261, 262, an output current measurement section 263, an output voltage measurement section 264, and an output power computation section 265.

The A/D converter 261 receives an analog signal indicating the AC current Iac detected by the AC current detector 13 and the measurement lock signal S1 outputted from the MPPT control section 22. While not receiving the measurement lock signal S1, the A/D converter 261 converts the received analog signal indicating the AC current Iac to a digital signal, and outputs the converted digital signal indicating the AC current Iac to the output current measurement section 263. On the other hand, while receiving the measurement lock signal S1, the A/D converter 261 does not perform signal conversion. This can avoid the AC current Iac being measured in an unstable state due to the transient state. The rest of the configuration is similar to that of the A/D converter 211 of the input power measurement section 21.

The A/D converter 262 receives an analog signal indicating the AC voltage Vac detected by the AC voltage detector 14 and the measurement lock signal S1 outputted from the MPPT control section 22. While not receiving the measurement lock signal S1, the A/D converter 262 converts the received analog signal indicating the AC voltage Vac to a digital signal, and outputs the converted digital signal indicating the AC voltage Vac to the output voltage measurement section 264. On the other hand, while receiving the measurement lock signal S1, the A/D converter 262 does not perform signal conversion. This can avoid the AC voltage Vac being measured in an unstable state due to the transient state. The rest of the configuration is similar to that of the A/D converter 211 of the input power measurement section 21.

The output current measurement section 263 measures the AC current Iac based on the digital signal indicating the AC current Iac inputted from the A/D converter 261. The output current measurement section 263 outputs the measured AC current Iac to the output power computation section 265.

The output voltage measurement section 264 measures the AC voltage Vac based on the digital signal indicating the AC voltage Vac inputted from the A/D converter 262. The output voltage measurement section 264 outputs the measured AC voltage Vac to the output power computation section 265.

The output power computation section 265 computes the output power (active power) Pdc based on the AC current Iac measured by the output current measurement section 263 and the AC voltage Vac measured by the output voltage measurement section 264. The output power Pac computed by the output power computation section 265 represents the output power Pac measured by the output power measurement section 26.

According to this embodiment, the measurement lock signal S1 enables avoiding the input power Pdc or the output power Pac being measured at the time of the transient state due to the MPPT control.

In the MPPT control, the DC voltage Vdc is varied constantly. Thus, if the input power Pdc or the output power Pac is measured at an arbitrary time, the input power Pdc or the output power Pac may be measured in an unstable state (transient state). The conversion efficiency of the inverter 1 determined from the input power Pdc or the output power Pac measured in such a state has low measurement accuracy.

In contrast, this embodiment can avoid measurement of the input power Pdc and the output power Pac in the transient state. This can improve the measurement accuracy in the conversion efficiency of the inverter 1.

Second Embodiment

Figure 4:
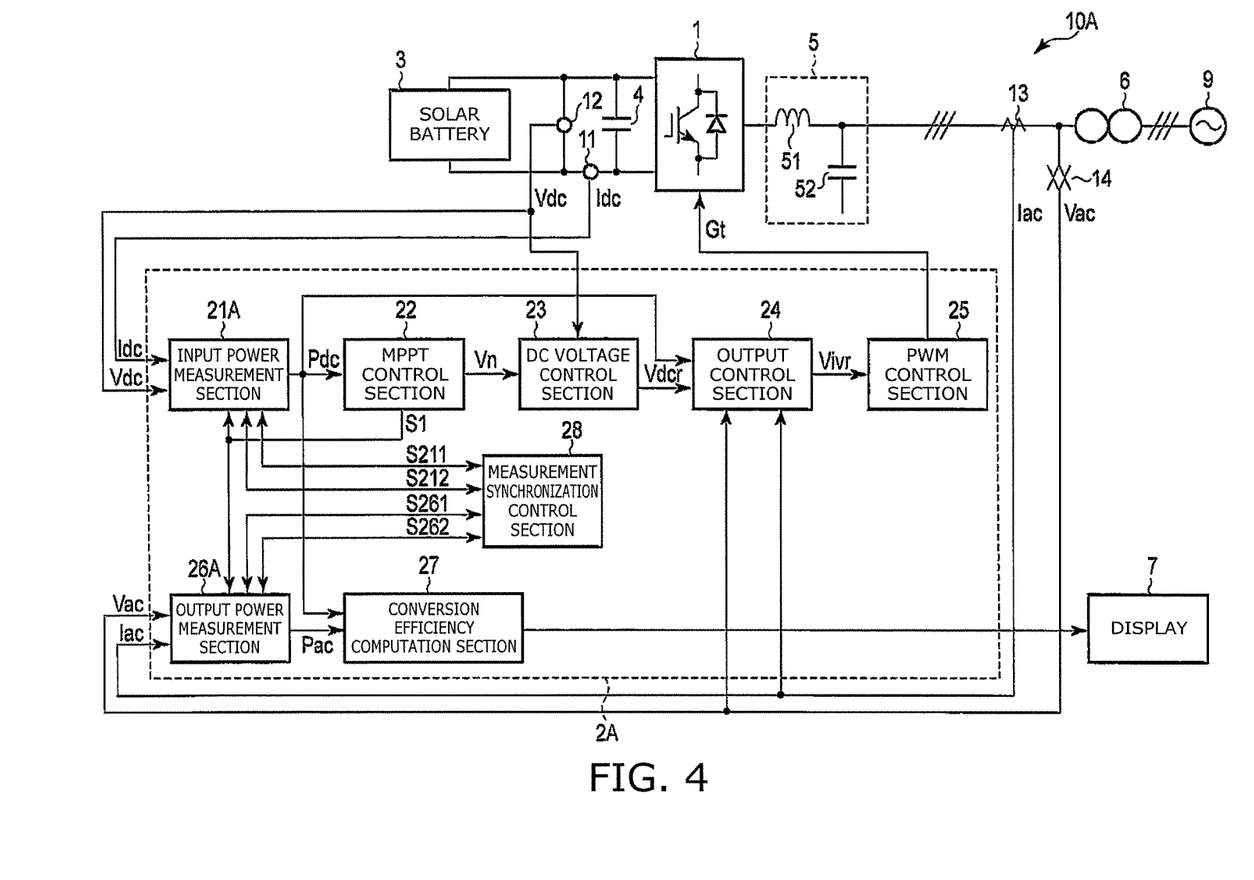
FIG. 4 is a configuration view showing the configuration of a solar power generation system based on a control device according to a second embodiment of the invention.
Figure 5:
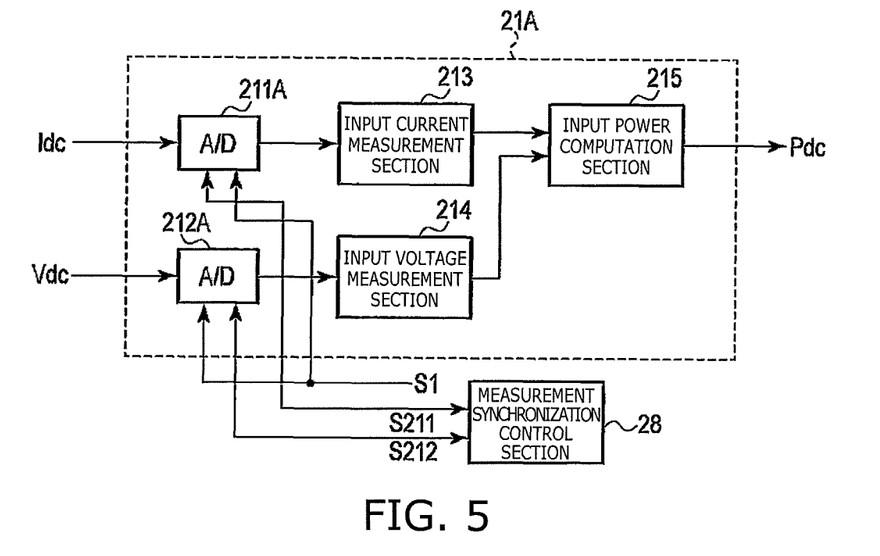
FIG. 5 is a configuration view showing the configuration of the input power measurement section according to the second embodiment.
Figure 6:
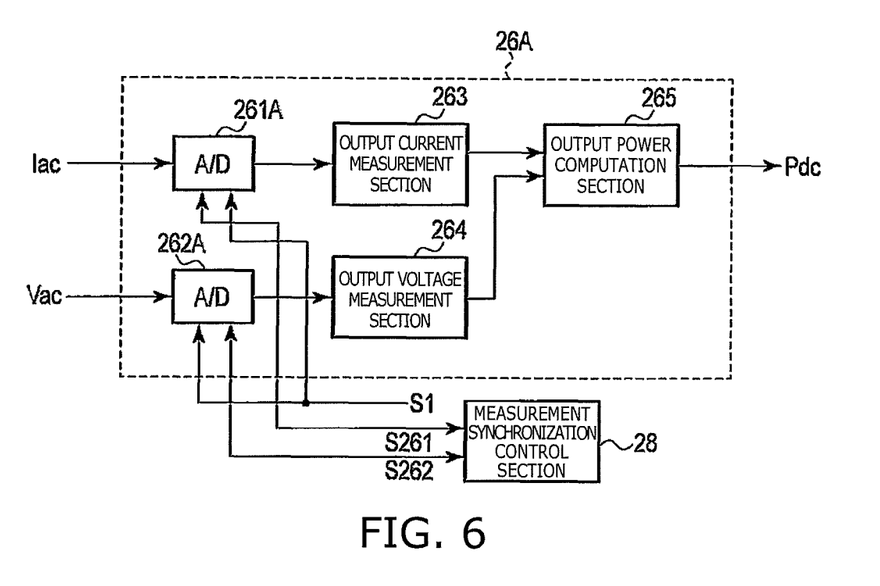
FIG. 6 is a configuration view showing the configuration of the output power measurement section according to the second embodiment.

FIG. 4 is a configuration view showing the configuration of a solar power generation system 10A based on a control device 2A according to a second embodiment of the invention. FIG. 5 is a configuration view showing the configuration of the input power measurement section 21A according to this embodiment. FIG. 6 is a configuration view showing the configuration of the output power measurement section 26A according to this embodiment.

The solar power generation system 10A is different from the solar power generation system 10 according to the first embodiment shown in FIG. 1 in that the control device 2 is replaced by the control device 2A. The control device 2A is different from the control device 2 according to the first embodiment as follows. The input power measurement section 21 shown in FIG. 2 is replaced by the input power measurement section 21A shown in FIG. 5. The output power measurement section 26 shown in FIG. 3 is replaced by the output power measurement section 26A shown in FIG. 6. A measurement synchronization control section 28 is added. The rest of the configuration is similar to that of the first embodiment.

The measurement synchronization control section 28 performs control for synchronizing the measurement of the input power Pdc by the input power measurement section 21A and the measurement of the output power Pac by the output power measurement section 26A. Specifically, the measurement synchronization control section 28 transmits/receives information S211, S212, S261, S262 to/from the two A/D converters 211A, 212A of the input power measurement section 21A and the two A/D converters 261, 262 of the output power measurement section 26A, respectively. Thus, the measurement synchronization control section 28 performs control so as to synchronize the time for converting (i.e. measuring) signals in all the A/D converters 211, 212, 261, 262. The signal used for reference for synchronization may be a timer incorporated in the control device 2A or a signal received from the outside of the control device 2A.

The measurement synchronization control section 28 synchronizes the measurement by the input power measurement section 21A and the measurement by the output power measurement section 26A. Thus, the time at which the input power Pdc is measured by the input power measurement section 21A is made generally simultaneous with the time at which the output power Pac is measured by the output power measurement section 26A. Accordingly, the conversion efficiency of the inverter 1 is determined from the input power Pdc and the output power Pac measured generally at the same time. This determines conversion efficiency with high accuracy.

This embodiment synchronizes the measurement by the input power measurement section 21A and the measurement by the output power measurement section 26A. Thus, the conversion efficiency of the inverter 1 can be determined with measurement accuracy higher than the measurement accuracy according to the first embodiment.

In the configuration of the embodiments, the measurement lock signal S1 is outputted from the MPPT control section 22. However, the measurement lock signal S1 may be generated in a location different from the MPPT control section 22. Instead of generating the measurement lock signal S1 for locking the measurement at the time of the transient state, a measurement instruction signal for performing measurement at the time of avoiding the transient state may be generated to perform measurement at the time of avoiding the transient state. Furthermore, the signal for avoiding measurement at the time of the transient state such as the measurement lock signal S1 or the measurement instruction signal may be used for processing for adjusting the transfer time of signals in view of e.g. the transmission time and the response time of devices. For instance, a timer may be provided in the transmission path to delay the transfer of signals.

In the embodiments, the variation of the DC voltage Vdc by the MPPT control section 22 may be performed at a predetermined interval. Then, the input power Pdc and the output power Pac may be measured at a predetermined interval for avoiding the time of the transient state. In this case, the configuration can omit e.g. the measurement lock signal S1 and the measurement instruction signal.

In the embodiments, the A/D converter does not perform signal conversion at the time of the transient state. However, the A/D converter may perform signal conversion at the time of the transient state. For instance, the conversion efficiency computation section 27 may be configured to compute the conversion efficiency without using the input power Pdc and the output power Pac measured at the time of the transient state. Then, the A/D converter may perform signal conversion even at the time of the transient state. To realize such a configuration, the signal such as the measurement lock signal S1 or the measurement instruction signal may be received by the conversion efficiency computation section 27.

Besides the aforementioned configuration, the embodiments may have an arbitrary configuration as long as the conversion efficiency is not computed based on the input power Pdc and the output power Pac measured in the transient state.

The invention is not limited to the embodiments without change as described above. In the practical stage, the components of the invention can be modified without departing from the spirit of the invention. Various inventions can be formed by appropriately combining a plurality of components disclosed in the above embodiments. For instance, some components may be deleted from all the components shown in the embodiments. Furthermore, the components appearing in different embodiments may be combined appropriately.

The invention claimed is:

1. A solar power generation system comprising:
an inverter configured to convert DC power inputted from a solar battery to AC power;
a maximum power point tracking control section configured to perform maximum power point tracking control on the inverter;
an input power measurement section configured to measure the DC power inputted to the inverter at a time of avoiding a transient state due to variation in DC voltage of the inverter by the maximum power point tracking control;
an output power measurement section configured to measure the AC power outputted from the inverter at the time of avoiding the transient state;
a conversion efficiency computation section configured to compute conversion efficiency of the inverter based on the DC power measured by the input power measurement section and the AC power measured by the output power measurement section; and
a transient state avoidance signal output section configured to output a transient state avoidance signal for performing measurement at a time of avoiding the transient state each time the transient state avoidance signal output section outputs an instruction for varying the DC voltage of the inverter by the maximum power point tracking control, wherein
the input power measurement section measures the DC power based on the transient state avoidance signal outputted from the transient state avoidance signal output section, and
the output power measurement section measures the AC power based on the transient state avoidance signal outputted from the transient state avoidance signal output section.

2. The system according to claim 1, further comprising:
a measurement synchronization section configured to perform control for synchronization so that measurement by the input power measurement section and measurement by the output power measurement section are made simultaneous.

3. The system according to claim 1, further comprising:
a measurement synchronization section configured to perform control for synchronization so that measurement by the input power measurement section and measurement by the output power measurement section are made simultaneous.

4. A control device for a solar power generation system including an inverter configured to convert DC power inputted from a solar battery to AC power, the device comprising:
a maximum power point tracking control section configured to perform maximum power point tracking control on the inverter;
an input power measurement section configured to measure the DC power inputted to the inverter at a time of avoiding a transient state due to variation in DC voltage of the inverter by the maximum power point tracking control;
an output power measurement section configured to measure the AC power outputted from the inverter at the time of avoiding the transient state;
a conversion efficiency computation section configured to compute conversion efficiency of the inverter based on the DC power measured by the input power measurement section and the AC power measured by the output power measurement section; and
a transient state avoidance signal output section configured to output a transient state avoidance signal for performing measurement at a time of avoiding the transient state each time the transient state avoidance signal output section outputs an instruction for varying the DC voltage of the inverter by the maximum power point tracking control, wherein
the input power measurement section measures the DC power based on the transient state avoidance signal outputted from the transient state avoidance signal output section, and
the output power measurement section measures the AC power based on the transient state avoidance signal outputted from the transient state avoidance signal output section.

5. The device according to claim 4, further comprising:
a measurement synchronization section configured to perform control for synchronization so that measurement by the input power measurement section and measurement by the output power measurement section are made simultaneous.

6. The device according to claim 4, further comprising:
a measurement synchronization section configured to perform control for synchronization so that measurement by the input power measurement section and measurement by the output power measurement section are made simultaneous.

7. A control method for a solar power generation system including an inverter configured to convert DC power inputted from a solar battery to AC power, the control method comprising:
performing maximum power point tracking control on the inverter;
measuring the DC power inputted to the inverter at a time of avoiding a transient state due to variation in DC voltage of the inverter by the maximum power point tracking control;
measuring the AC power outputted from the inverter at the time of avoiding the transient state;
computing conversion efficiency of the inverter based on the measured DC power and the measured AC power; and
outputting a transient state avoidance signal for performing measurement at a time of avoiding the transient state each time an instruction for varying the DC voltage of the inverter by the maximum power point tracking control is outputted, wherein measurement of the DC power is performed based on the transient state avoidance signal, and measurement of the AC power is performed based on the transient state avoidance signal.

8. The method according to claim 7, further comprising:

performing control for synchronization so that measurement of the DC power and measurement of the AC power are made simultaneous.

9. The method according to claim 7, further comprising:

performing control for synchronization so that measurement of the DC power and measurement of the AC power are made simultaneous.

\* \* \* \* \*

UNITED STATES PATENT AND TRADEMARK OFFICE
CERTIFICATE OF CORRECTION

| | |
|---|---|
| PATENT NO. | : 10,454,417 B2 |
| APPLICATION NO. | : 16/091594 |
| DATED | : October 22, 2019 |
| INVENTOR(S) | : Yuji Matsuoka et al. |

It is certified that error appears in the above-identified patent and that said Letters Patent is hereby corrected as shown below:

On the Title Page

Item (73), the Assignee's name is incorrect. Item (73) should read:
-- (73) Assignee: TOSHIBA MITSUBISHI-ELECTRIC INDUSTRIAL SYSTEMS CORPORATION, Chuo-ku (JP) --

Signed and Sealed this
Seventh Day of January, 2020

Andrei Iancu
*Director of the United States Patent and Trademark Office*